(12) United States Patent
Skipper

(10) Patent No.: US 6,668,975 B2
(45) Date of Patent: Dec. 30, 2003

(54) MODULAR LADDER WITH REMOVABLE RUNGS

(75) Inventor: Timothy Scott Skipper, Ormond Beach, FL (US)

(73) Assignee: Center Ridge Outdoors, L.L.C., Ormond Beach, FL (US)

( * ) Notice: Subject to any disclaimer, the term of this patent is extended or adjusted under 35 U.S.C. 154(b) by 0 days.

(21) Appl. No.: 10/058,901

(22) Filed: Jan. 30, 2002

(65) Prior Publication Data

US 2003/0141146 A1 Jul. 31, 2003

(51) Int. Cl.$^7$ ................................................. E04G 3/00
(52) U.S. Cl. ........................ 182/100; 182/92; 182/189; 248/243
(58) Field of Search ...................... 182/90, 100, 120, 182/92, 129, 151, 178, 228; 248/243, 221.2

(56) References Cited

U.S. PATENT DOCUMENTS

| | | | | |
|---|---|---|---|---|
| 3,399,746 A | * | 9/1968 | Wood ..................... | 182/100 X |
| 3,858,684 A | * | 1/1975 | Goings .................... | 182/207 |
| 4,086,980 A | * | 5/1978 | Shortes et al. ............. | 182/151 |
| 4,450,936 A | * | 5/1984 | Strom ..................... | 182/92 |
| 4,892,170 A | * | 1/1990 | O'Donnell ................ | 182/100 |
| 5,040,635 A | * | 8/1991 | Strickland ................ | 182/100 |
| 5,335,754 A | * | 8/1994 | Gibson .................... | 182/204 |
| 5,816,362 A | * | 10/1998 | Jenkins, Jr. .............. | 182/100 |
| 6,076,634 A | * | 6/2000 | Simon ..................... | 182/100 |
| 6,170,609 B1 | * | 1/2001 | Dech ...................... | 182/187 |
| 6,247,553 B1 | * | 6/2001 | Jones ..................... | 182/92 |
| 6,431,501 B1 | * | 8/2002 | Molek .................... | 248/68.1 |
| 6,457,559 B1 | * | 10/2002 | Schlueter et al. .......... | 182/159 |

FOREIGN PATENT DOCUMENTS

| | | | | |
|---|---|---|---|---|
| EP | 0045019 | * | 2/1982 | ............ 182/100 X |
| EP | 0359054 | * | 3/1990 | ............ 182/100 X |

* cited by examiner

Primary Examiner—Bruce A. Lev
(74) Attorney, Agent, or Firm—John Wiley Horton

(57) ABSTRACT

A ladder incorporating a vertical support structure and a set of removable rungs. The vertical support structure is formed by stacking a series of interlocking sticks. The sticks incorporate features allowing the removable installation of the rungs. The rungs are small and light, so that a set of such rungs may be easily carried by a user. The vertical sticks generally remain attached to the object to be climbed—such as a tree or pole. When the user wishes to climb the object, the user installs the rungs as he or she climbs. The rungs are then removed upon descent. In this manner, unauthorized climbing of the object is inhibited. Locking features are also included to prevent unauthorized access by another person having a set of removable rungs.

Several different embodiments of the removable rungs are disclosed. The common feature of all these embodiments is the fact that the rungs cannot come loose from the vertical stick while they are under load. The application of the invention to different types of hunting tree stands is also disclosed in detail, although the application of the invention extends far beyond hunting products.

10 Claims, 24 Drawing Sheets

MODULAR LADDER WITH REMOVABLE RUNGS

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of ladders. More specifically, the invention comprises a modular ladder having removable steps.

2. Description of the Related Art

The incorporation of removable rungs into various structures is well known in the prior art. As one example, U.S. Pat. No. 6,247,553 to Jones (2001) discloses a removable rung (or step) designed to be applied to a steel T-post of the type commonly used for cattle fencing. It allows a user to step over a modern fence line without having to put weight on the strands of barbed wire. The Jones device is not easily removable, however. It is designed to be installed and left in place. Thus, it is ill suited for the type of application encompassed by the present invention.

U.S. Pat. No. 3,833,090 to Georgianna (1974) discloses a removable step designed to be locked into a steel support column. This invention is directed to warehouse racks, whose vertical columns already include slots for the mounting of shelves and the like. The step design in the '090 patent takes advantage of these pre-existing slots. The step is quite large and cumbersome, however. It would be difficult to store a set of such steps on the user's person, and quite cumbersome to carry them over long distances.

A similar device is disclosed in U.S. Pat. No. 4,450,936 to Strom (1984). The Strom device also takes advantage of the pre-existing slots found in warehouse columns. Unlike the Georgianna device, though, it is formed of simple bar stock components. The '936 device should therefore be easier to fabricate. It is still quite bulky, however. In addition, it requires a support column having a large interior cavity so that the step can be "snaked" into position. While such a large cavity is often found in warehouse columns, it is rarely found elsewhere.

Accordingly, the prior art devices are limited in that they:
1. Are difficult to apply and remove;
2. Are heavy;
3. Are bulky; and
4. Require a vertical column having a large interior cavity. Require the deployment

BRIEF SUMMARY OF THE INVENTION

A ladder is composed of a vertical support structure and a set of rungs. In the present invention, the vertical support structure is formed by stacking a series of interlocking sticks. The sticks incorporate features allowing the removable installation of a set of rungs. The rungs are small and light, so that a set of such rungs may be easily carried by a user. The vertical sticks generally remain attached to the object to be climbed—such as a tree or pole. When the user wishes to climb the object, the user installs the rungs as he or she climbs. The rungs are then removed upon descent. In this manner, unauthorized climbing of the object is inhibited.

Several different embodiments of the removable rungs are disclosed. The common feature of all these embodiments is the fact that the rungs cannot come loose from the vertical stick while they are under load. The application of the invention to different types of hunting tree stands is also disclosed in detail, although the application of the invention extends far beyond hunting products.

REFERENCE NUMERALS IN THE DRAWINGS

| | |
|---|---|
| 10 | tree |
| 12 | tree stand |
| 14 | climbing stick |
| 16 | fixed rung |
| 18 | securing strap |
| 20 | standoff |
| 22 | slotted stick |
| 24 | slot |
| 26 | inclined hole |
| 28 | joining pin |
| 30 | strap lock |
| 32 | relief notch |
| 34 | joining hole |
| 36 | insertion slot |
| 38 | removable rung |
| 40 | step |
| 42 | insertion cylinder |
| 44 | key |
| 46 | camming wall |
| 48 | free wall |
| 50 | camming surface |
| 52 | ladder stand |
| 54 | slotted column |
| 56 | base |
| 58 | alternate stick |
| 60 | transverse hole |
| 62 | first alternate step |
| 64 | first alternate key |
| 66 | front face |
| 68 | right side face |
| 70 | left side face |
| 72 | rear face |
| 74 | vertical support column |
| 76 | alternate insertion slot |
| 78 | Z step |
| 80 | second alternate stick |
| 82 | lock slide |
| 84 | retaining pin |
| 86 | access cut |
| 88 | pin channel |
| 90 | lock hole |
| 92 | open channel |
| 94 | handle |

DETAILED DESCRIPTION OF THE INVENTION

Figure 1:
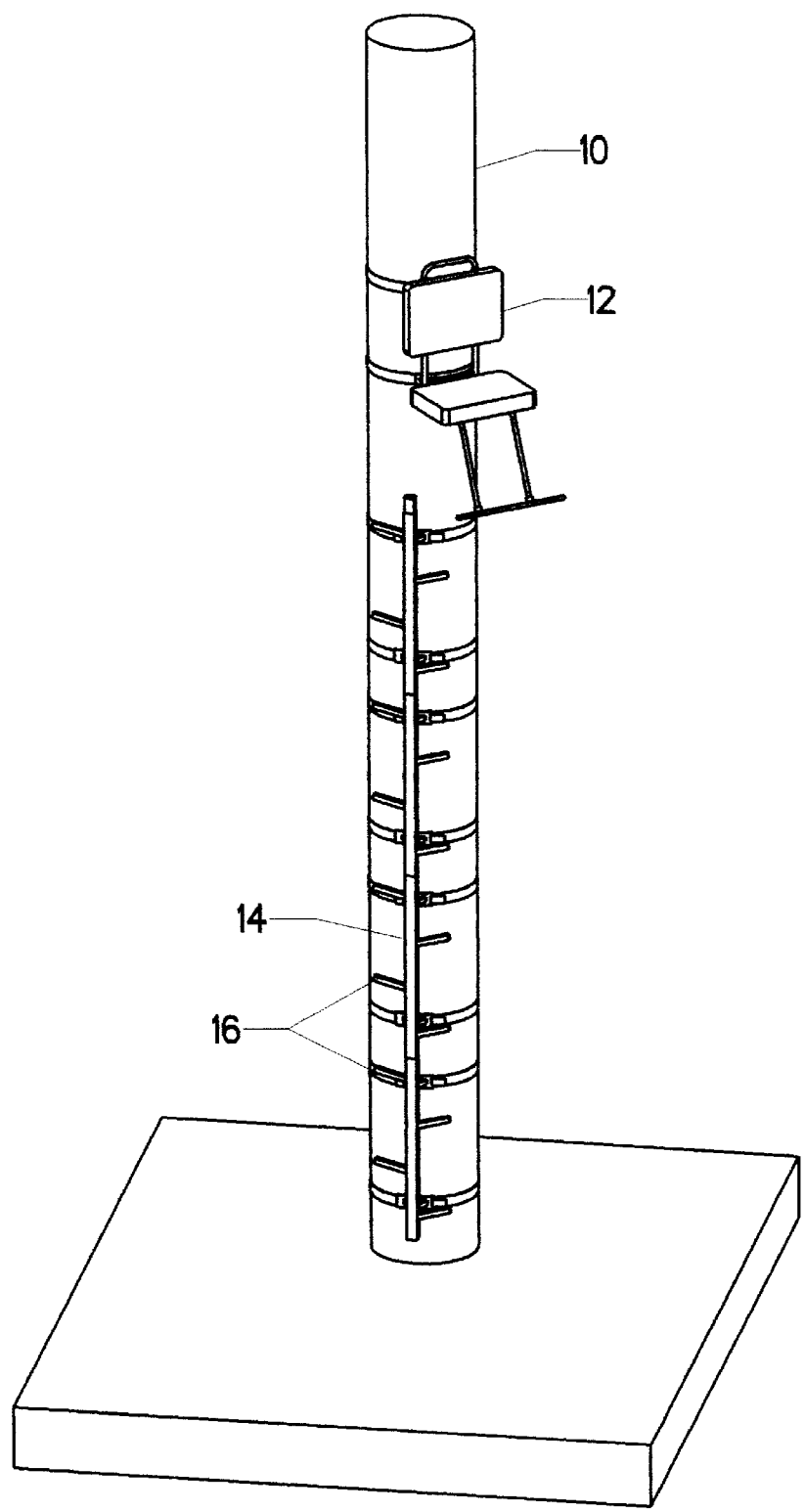
FIG. 1 is an isometric view, showing a prior art tree stand and ladder.

The proposed invention allows a user to climb many types of vertical objects. One particular application of the invention is in the field of hunting, where tree stands are often employed to provide the hunter an elevated and stationary position. FIG. 1 shows a prior art tree stand 12 attached to a tree 10. As installing a tree stand requires considerable effort, hunters often wish to leave them in place. This requires a device for climbing the tree. FIG. 1 also discloses a prior art tree-climbing device. A series of climbing sticks 14 are linked together and attached to tree 10. Each climbing stick 14 has a series of fixed rungs 16.

Figure 2:
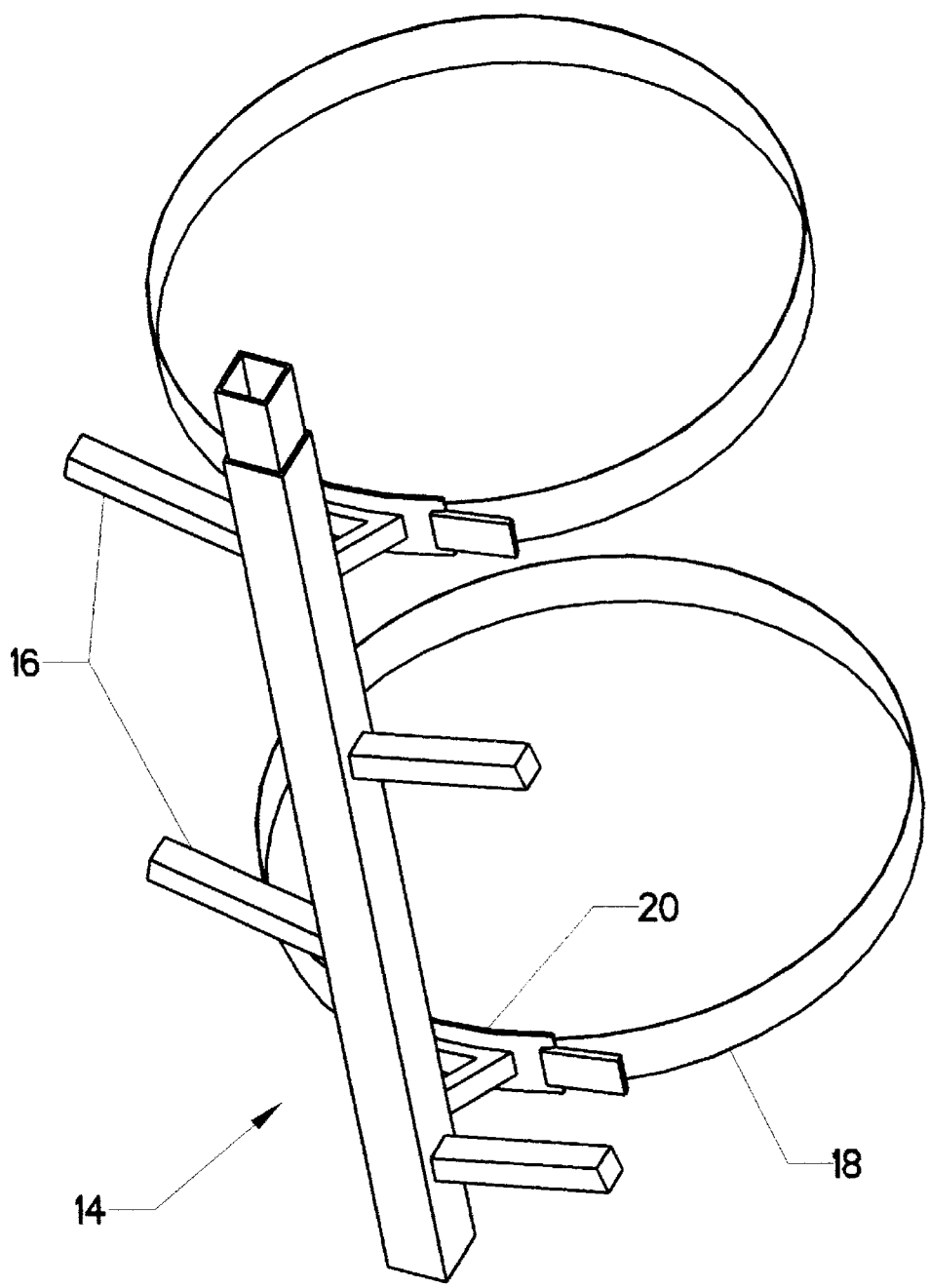
FIG. 2 is an isometric view, showing a prior art climbing stick in greater detail.

FIG. 2 shows an individual climbing stick 14 in more detail. The reader should be aware that the square vertical member is hollow, so that a second climbing stick 14 can be placed on top of the one shown and linked together using the smaller square section located on top of the climbing stick 14. Two stand offs 20 are provided to separate climbing stick 14 from the tree 10, thereby allowing clearance for the user's boots on fixed rungs 16. A pair of securing straps 18 are passed tightly around the tree 10 and locked in position by toggle clamps or other prior art means.

The prior art devices shown in FIGS. 1 and 2 are effective in allowing access to the tree stand 12. Unfortunately, when the user leaves the tree stand 12 unattended, other persons may use the ready access to steal the tree stand. In addition, many landowners are concerned about the safety of unsecured ladders in position on their property. If children or persons unfamiliar with tree climbing climb the unsecured ladders, they may be injured. Thus, it is desirable to create a ladder which cannot be climbed without specialized equipment.

Figure 3:
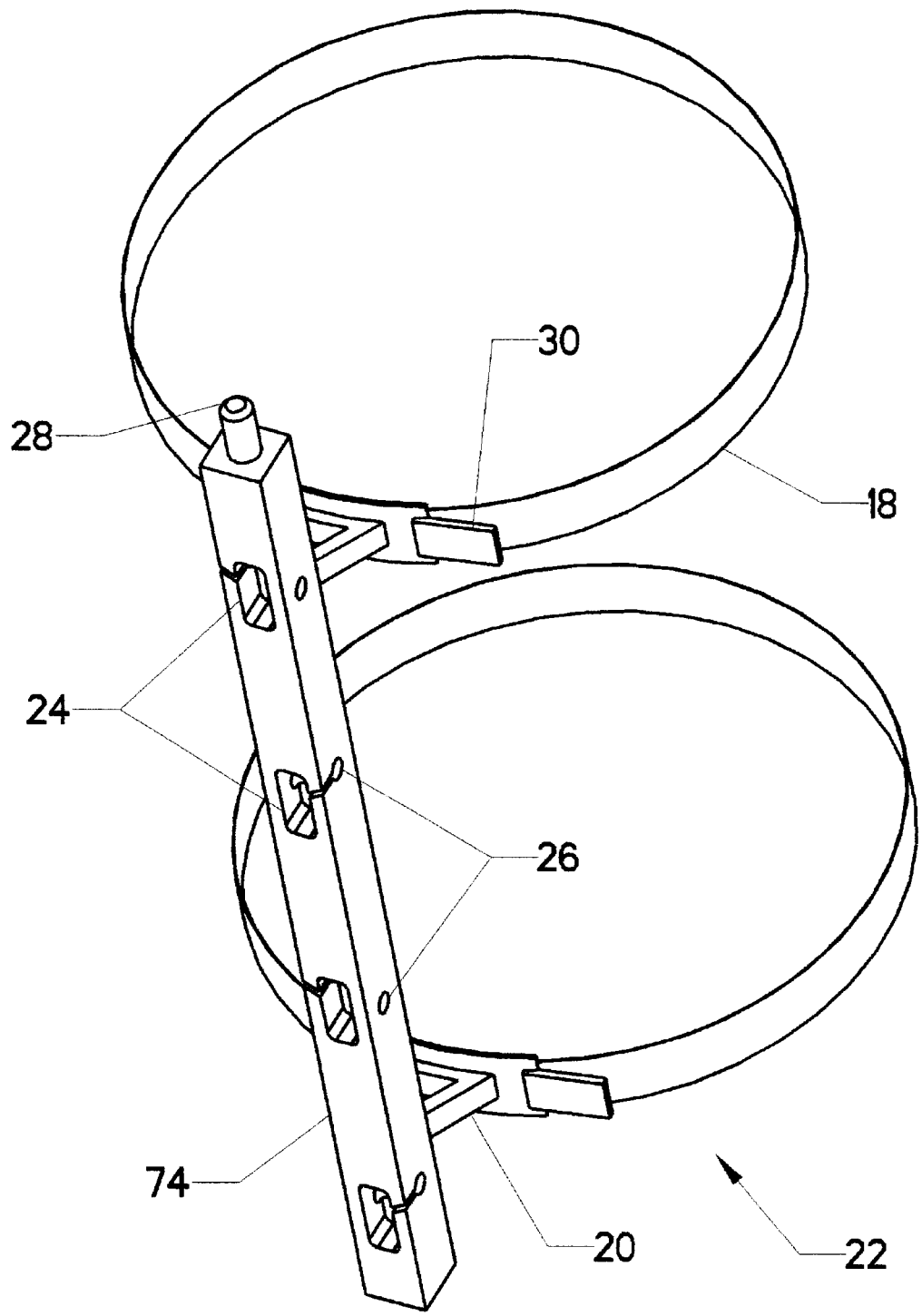
FIG. 3 is an isometric view, showing the vertical support element of the proposed invention.

FIG. 3 discloses one embodiment of the present invention. Slotted stick 22 is similar in its general configuration to the prior art climbing stick 14, except that it includes no fixed rungs 16. Two stand offs 20 are provided, along with securing straps 18. These straps 18 are locked in place by actuating strap locks 30.

The vertical support column 74 of slotted stick 22 is substantially modified over the prior art. Its front face opens into a series of slots 24. It is also transected by a series of inclined holes 26, the details of which will be described subsequently.

Figure 4:
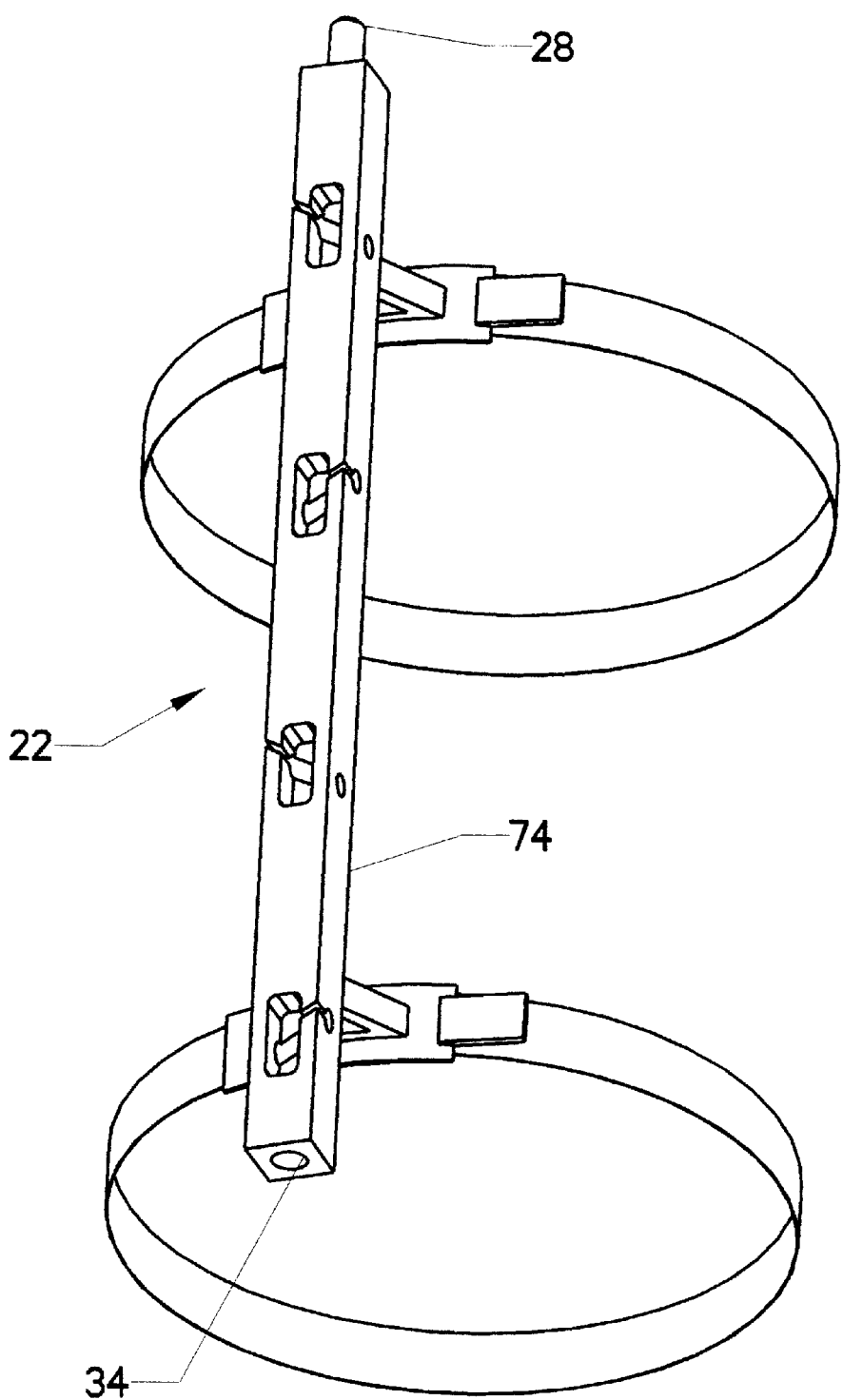
FIG. 4 is an isometric view, showing the vertical support element from a different angle.

The top of vertical support column 74 is formed into joining pin 28. Turning now to FIG. 4, the reader will observe that the lower portion of vertical support column 74 opens into joining hole 34. Those skilled in the art will therefore appreciate that a series of slotted sticks 22 can be linked together by inserting the joining pin 28 on the top of one vertical support column 74 into the joining hole 34 in a second vertical support column 74.

Figure 5:
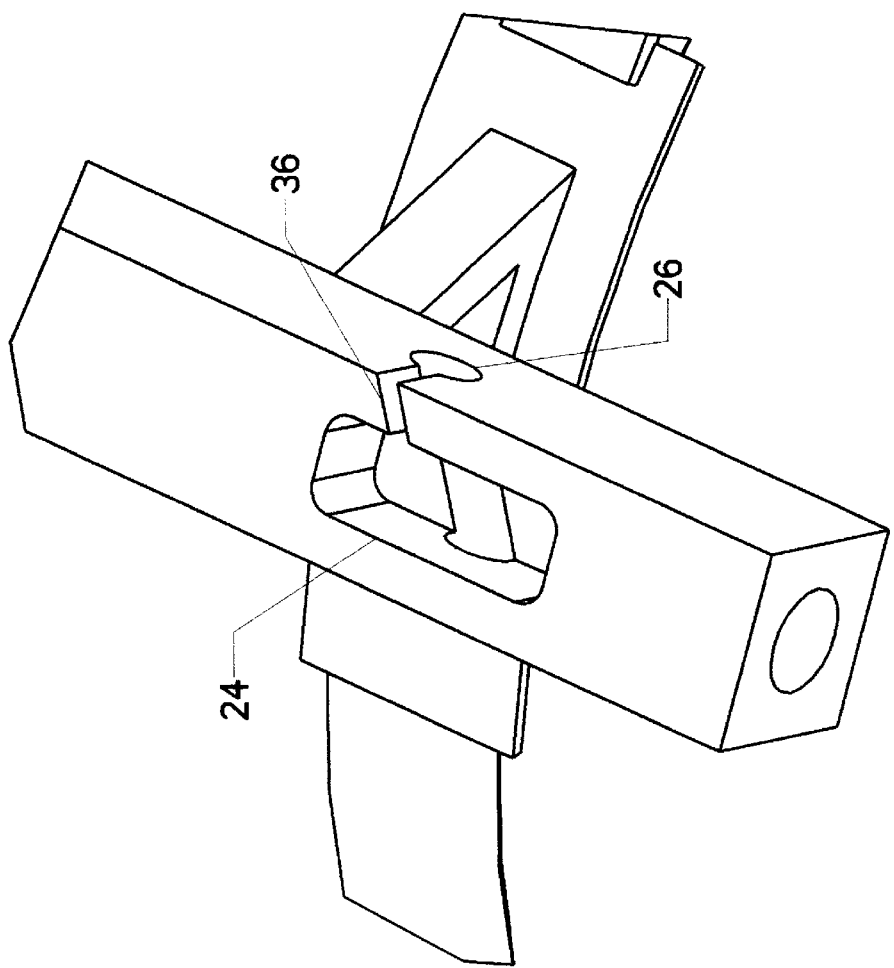
FIG. 5 is a detail view, showing the features designed to engage and hold the removable rung.
Figure 6:
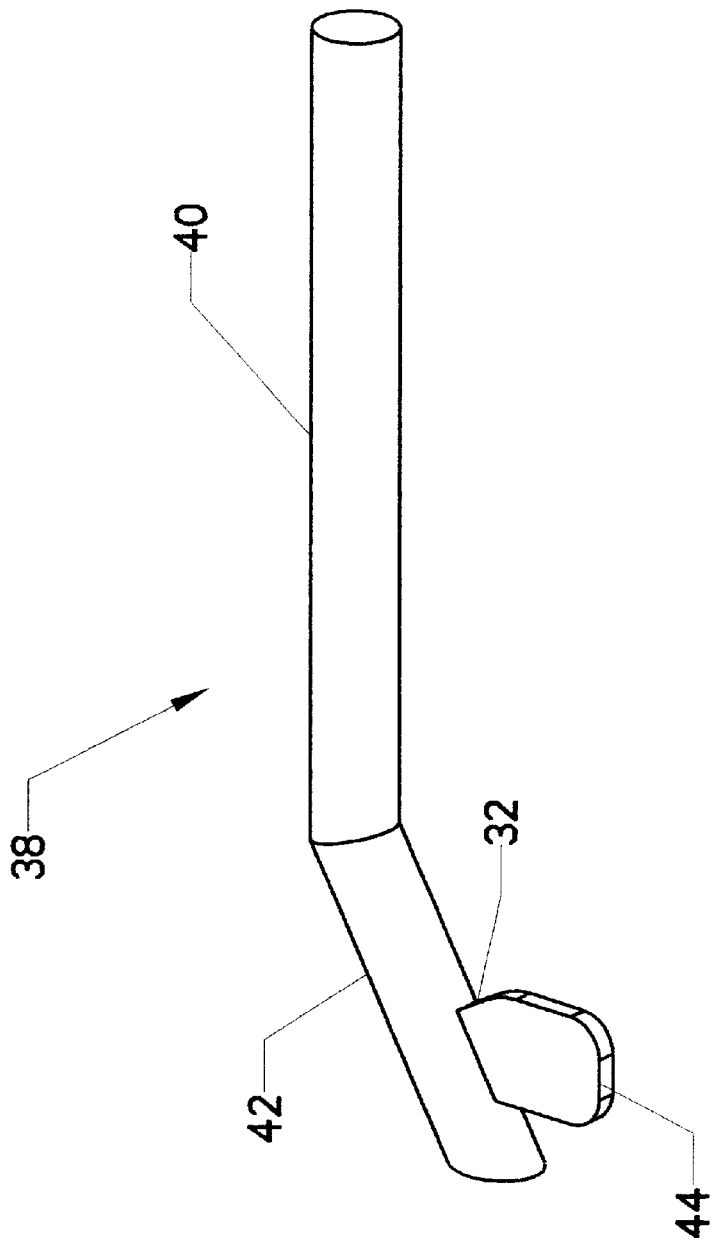
FIG. 6 is an isometric view, showing the removable rung.

FIG. 5 shows the intersection of slot 24 with inclined hole 26 in greater detail. Vertical support column 74 of slotted stick 22 has a square cross section—as shown. Inclined hole 26 passes completely through the square section, from its right side all the way to its left side. Slot 24 is cut into the front surface of the square section. Thus, slot 24 and inclined hole 26 intersect as shown. The front and right surfaces of the square section also open into insertion slot 36. Insertion slot 36 runs parallel to the center axis of inclined hole 26. The resulting geometry allows the insertion and removal of removable rung 38, shown in FIG. 6.

Removable rung 38 comprises insertion cylinder 42, step 40, and key. Insertion cylinder 42 and step 40 are joined at an angle. Those skilled in the art will realize that these two elements could be formed by bending a single piece of round stock. It is not necessary for the invention to include a sharply defined joint between the two. The reader will observe that key 44 also includes relief notch 32, the purpose of which will be explained shortly.

Figure 7:
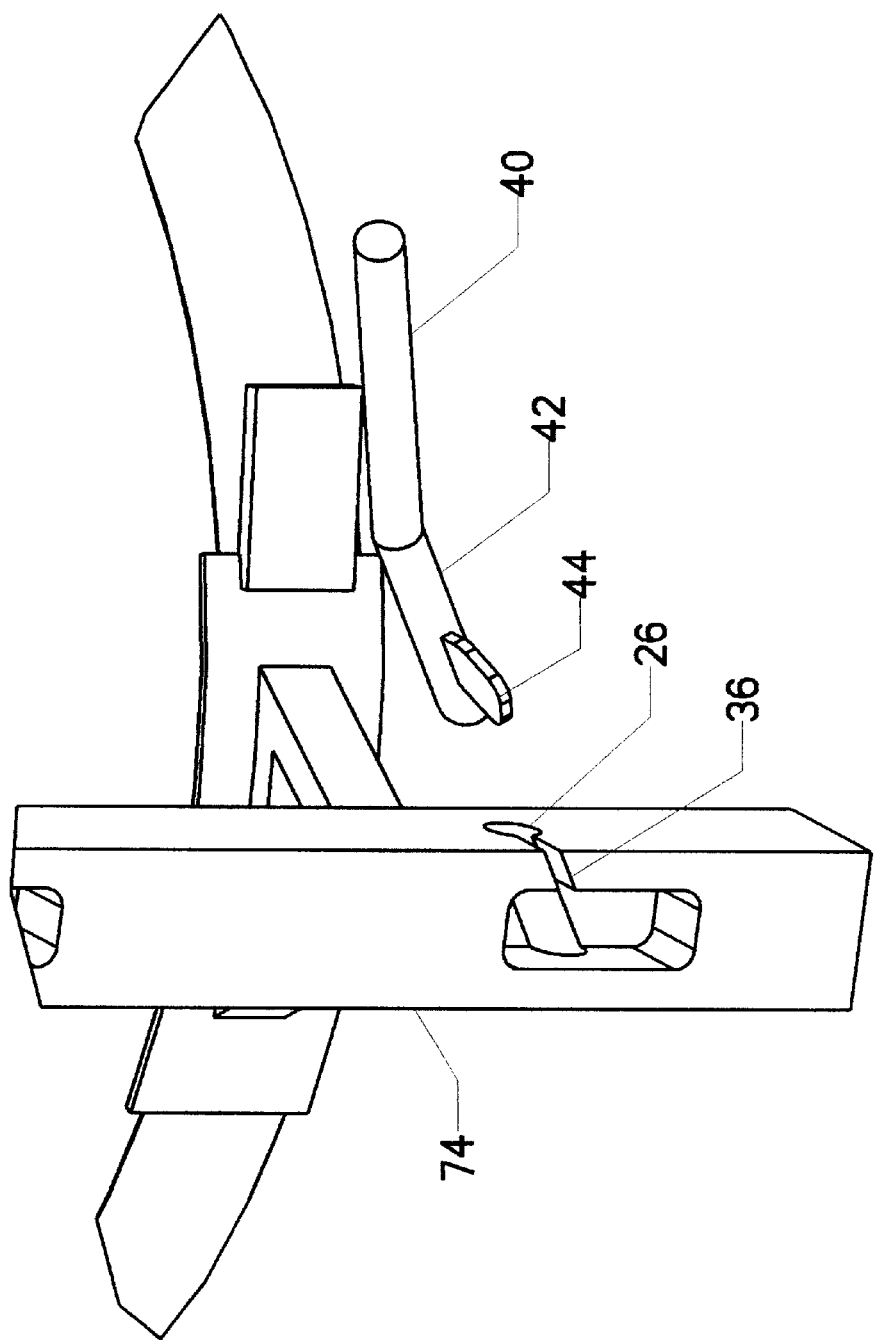
FIG. 7 is an isometric view, showing the installation of the removable rung.
Figure 8:
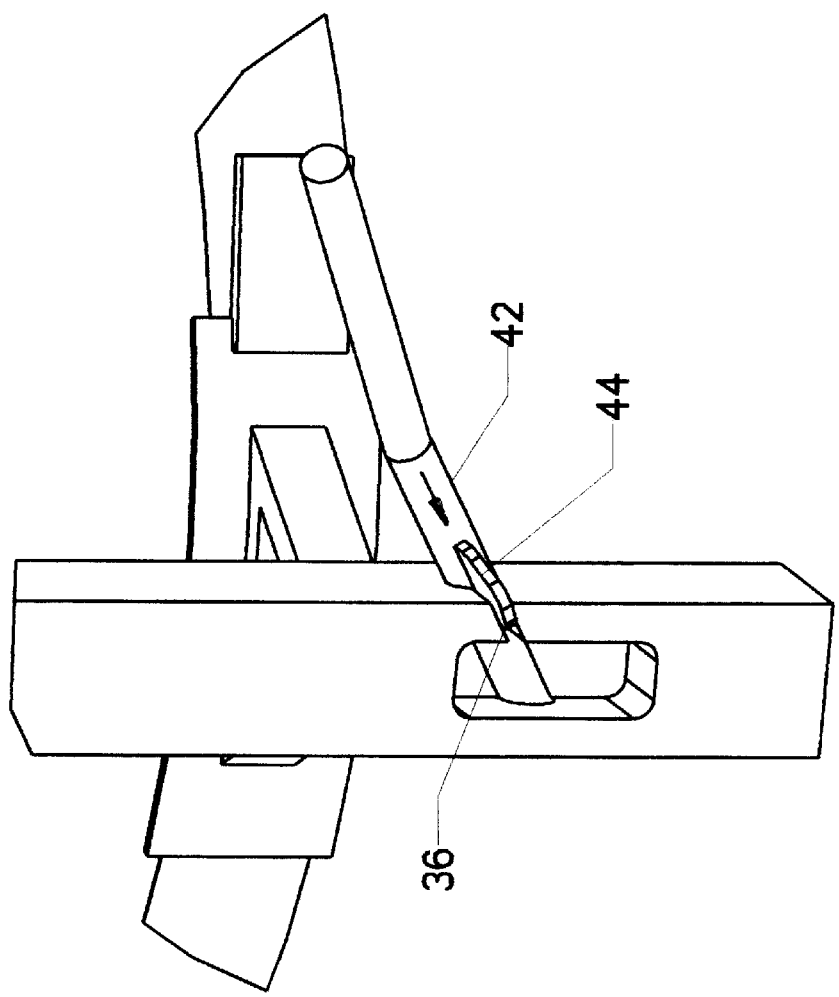
FIG. 8 is an isometric view, showing the installation of the removable rung.
Figure 9:
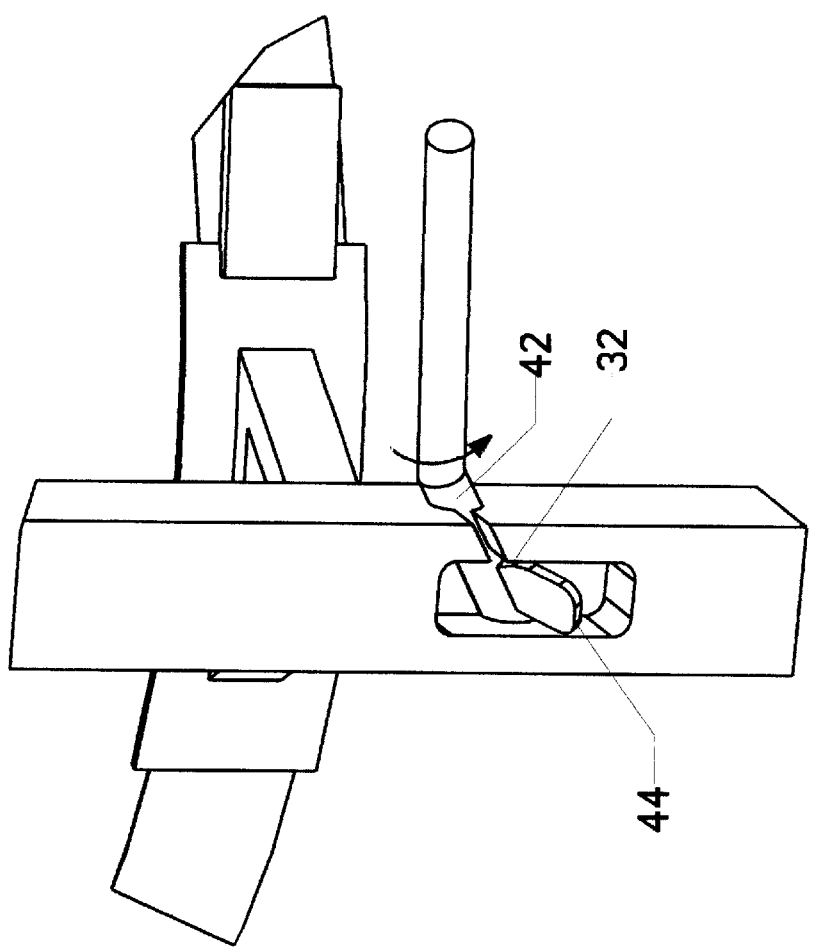
FIG. 9 is an isometric view, showing the installation of the removable rung.

FIG. 7 shows the first step in inserting removable rung 38 into vertical support column 74. Insertion cylinder 42 is aligned with inclined hole 26 and key 44 is aligned with insertion slot 36. In FIG. 8, insertion cylinder 42 is placed within inclined hole 26 and key 44 is shown sliding through insertion slot 36. In FIG. 9, key 44 has been pushed all the way through insertion slot 36 and is resting completely within slot 24. Key 44 is stopped from sliding further to the left because it has come up against the left wall of slot 24. At this point, the user rotates insertion cylinder 42 in the direction indicated (by grasping step 40). Key 44 the begins rotating down into slot 24. Relief notch 32 is provided so that key 44 does not hit the right wall of slot 24.

Figure 10:
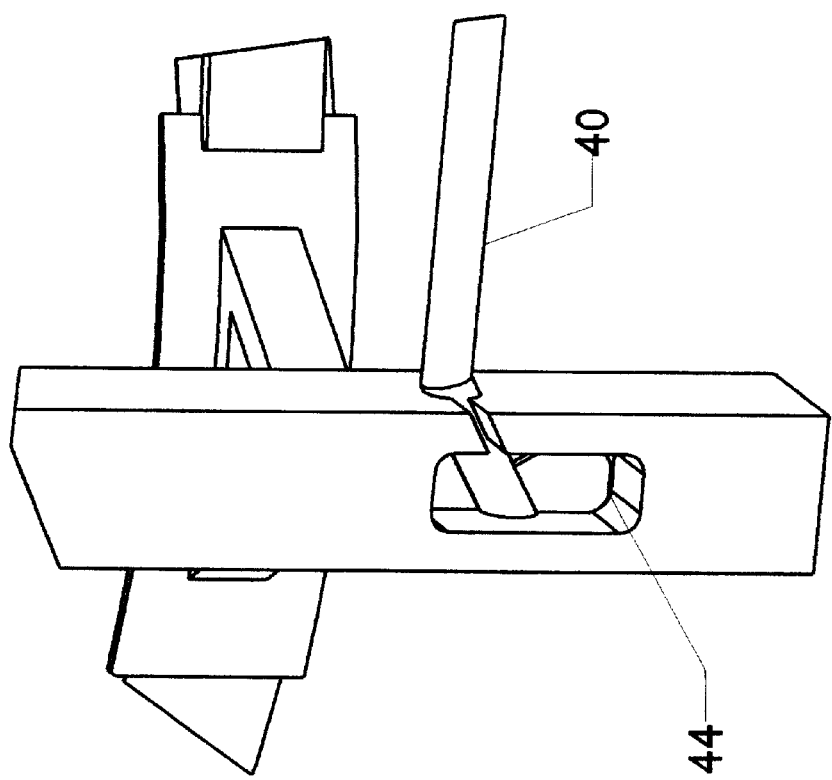
FIG. 10 is an isometric view, showing the installation of the removable rung.

In FIG. 10, key 44 has been rotated into its final position. The side of key 44 which is facing away from the viewer in FIG. 10 is now resting against the back of slot 24. The depth of slot 24 is set equal to the depth of the centerline of inclined hole 26, plus one half the thickness of key 44.

Figure 11:
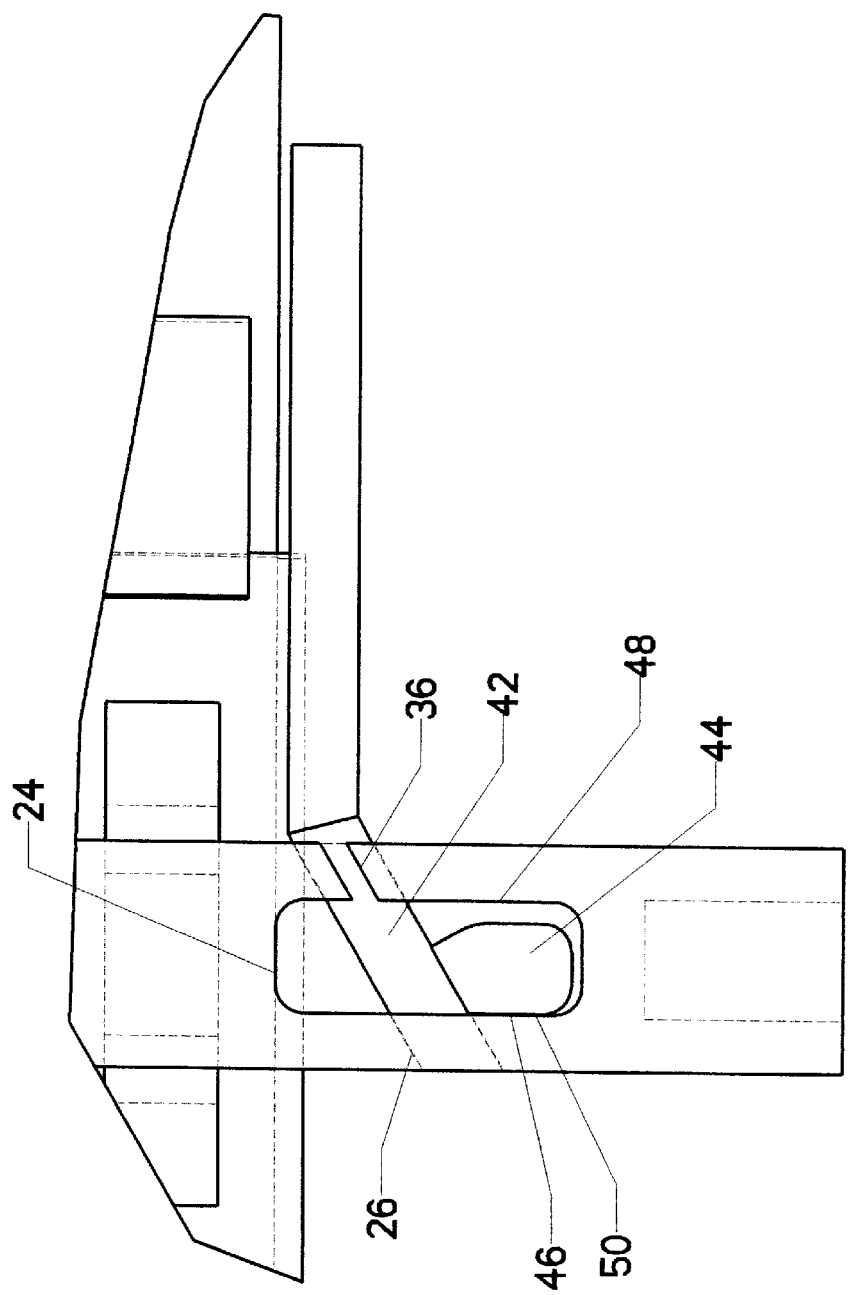
FIG. 11 is an elevation view, showing the removable rung locked in place.

FIG. 11 shows the same assembly in an elevation view. The reader will note that insertion cylinder 42 rests within inclined hole 26. Slot 24 is bounded on its right side by free wall 48, and on its left side by camming wall 46. The left facing surface of key 44 is designated as camming surface 50. The geometry of the device tends to hold removable rung 38 in place because of the following sequence: If insertion cylinder 42 is rotated so that key 44 moves toward the viewer in FIG. 11 (the only way it can be rotated), then camming surface 50 will bear against camming wall 46 and push removable rung 38 to the right.

Figure 12:
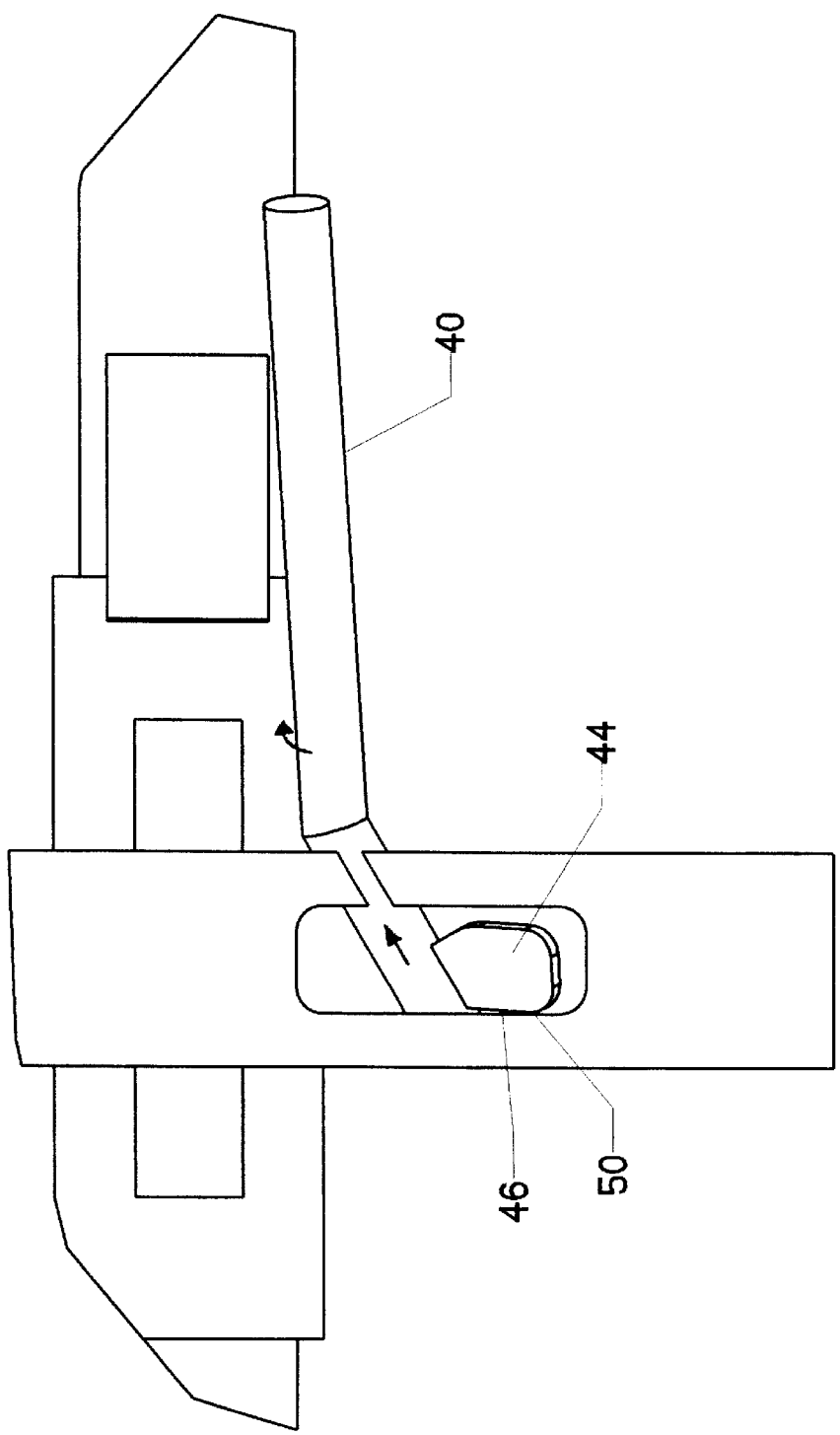
FIG. 12 is an elevation view, showing the camming action which holds the removable rung in place.

FIG. 12 shows the assembly after this rotation has started. The reader will observe that camming surface 50 has rotated against camming wall 46 and forced insertion cylinder 42 to slide to the right as indicated. This results in step 40 moving up and to the right, as well as rotating as shown. As a practical matter, this motion cannot occur when the user's weight is placed upon step 40. In other words, in order for key 44 to move out of its locked position, step 40 must overcome the user's weight and actually lift the user. Stated in reverse—the user's weight upon step 40 locks removable rung 38 securely in place. However, once the user's weight is removed, then the user can grasp removable rung 38, rotate it to the position where key 44 aligns with insertion slot 36, and remove it.

Figure 13:
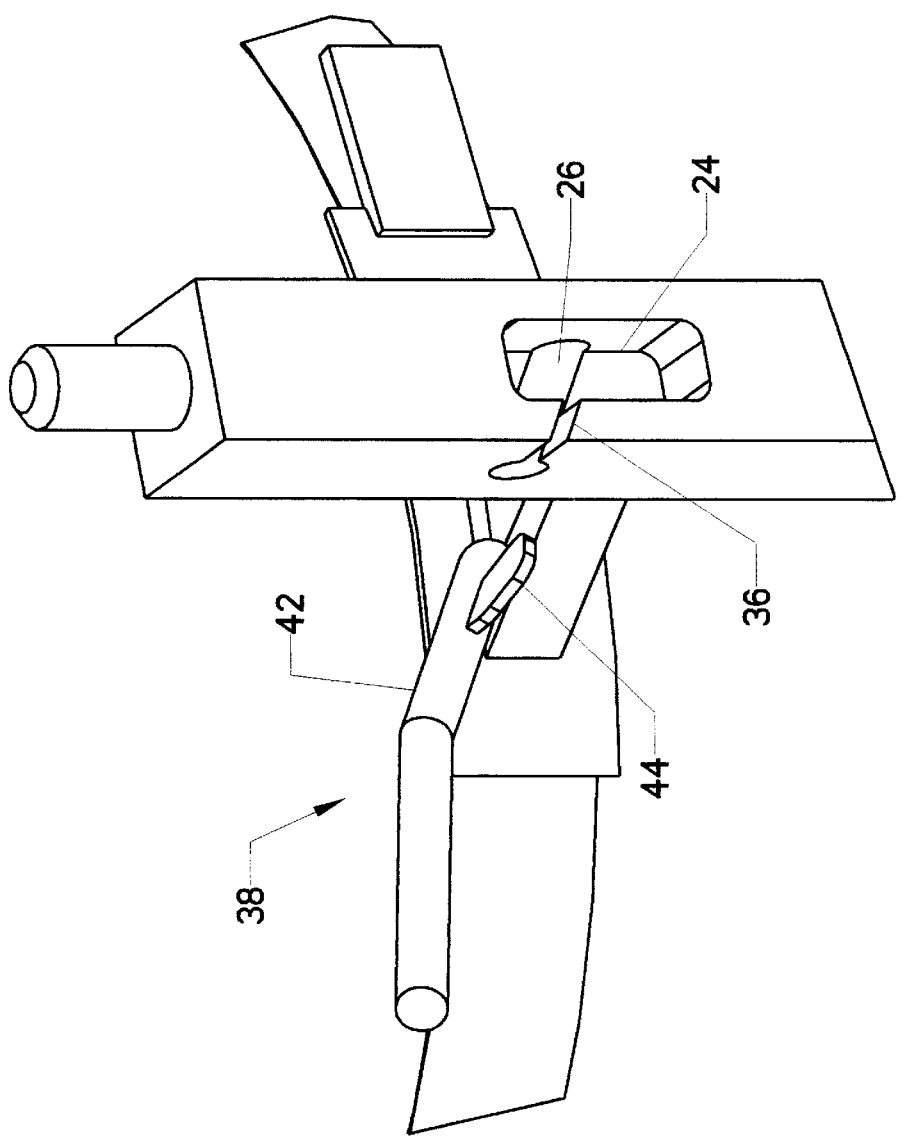
FIG. 13 is an isometric view, showing the installation of the removable rung in the opposite side of the slotted stick.

Of course, it is of little use to have rungs on only one side of vertical support column 74. Removable rung 38 must therefore be capable of insertion in either side of vertical support column 74. FIG. 13 shows the insertion of removable rung 38 in the left side of vertical support column 74. Referring briefly back to FIG. 4, the reader will observe that successive inclined holes 26 are inclined in opposite directions. FIG. 13 illustrates an inclined hole 26 configured to accept an insertion from the left. Likewise, insertion slot 36 is shown opening to the left. Removable rung 38 is absolutely identical to the one shown in FIGS. 6 through 12—it has simply been reoriented. Those skilled in the art will realize that removable rung 38 can be installed from the left by inserting insertion cylinder 42 into inclined hole 26 (with key 44 going through insertion slot 36) and thereafter rotating key 44 down into slot 24. It will then be locked in place under the same principles as described above.

Figure 14:
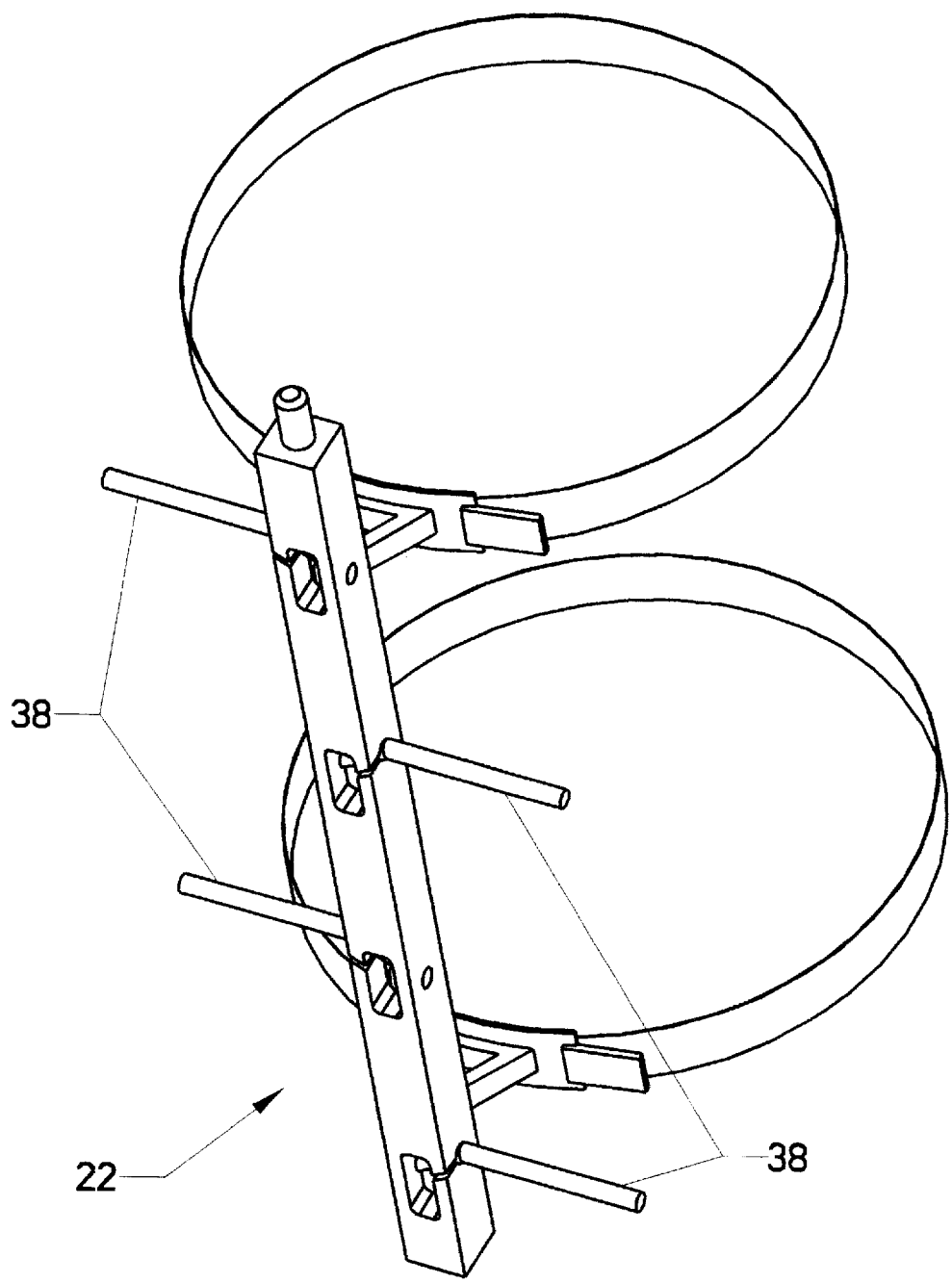
FIG. 14 is an isometric view, showing a completed assembly with removable rungs in place.
Figure 14B:
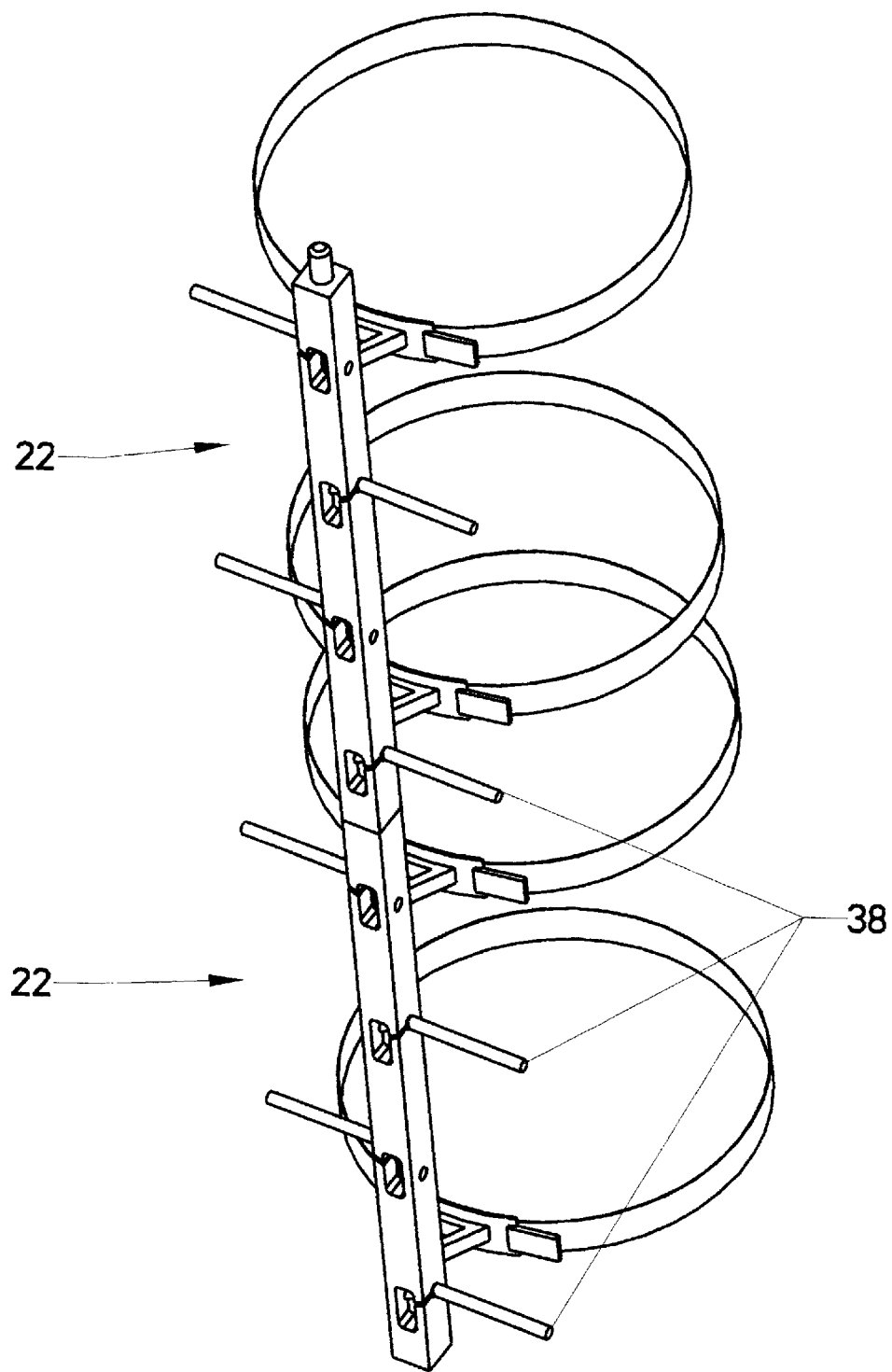
FIG. 14B is an isometric view, showing a completed assembly with two vertical support elements stacked together.

FIG. 14 shows slotted stick 22 with four removable rungs 38 in place. As noted above, inclined holes 26 alternate in orientation (along with the insertion slots 36) to allow the rungs to alternate. FIG. 14B shows two slotted sticks 22 stacked together. The reader will observe that the alternating pattern of removable rungs 38 continues through the stack of two or more slotted sticks 22.

In actual use, a stack of four or more slotted sticks 22 would be placed on the tree 10 or other object to be climbed. The sticks 22 are attached to the tree 10 using the securing straps 18 which are well known in the prior art. All removable rungs 38 would be removed before leaving the device unattended. A user wishing to climb the device would need to bring along a set of removable rungs 38. The user would then progressively install removable rungs 38 as he or she ascends the ladder. When the user later descends the ladder, removable rungs 38 would be progressively removed.

A rung to rung spacing of 9 inches in typical for this type of device. Accordingly, in order to ascend a twelve foot object, the user would need to bring approximately sixteen removable rungs 38. These rungs 38 can be made of aluminum alloy, resulting in a modest weight for a set of sixteen.

Material selection is important for slotted sticks 22, as it must withstand significant mechanical forces. It must also withstand prolonged exposure to sunlight and temperature extremes. Many metals could be used, but since the device must often be carried into the woods on foot, weight is a factor. Accordingly, glass reinforced ABS has been found to be particularly effective.

Figure 15:
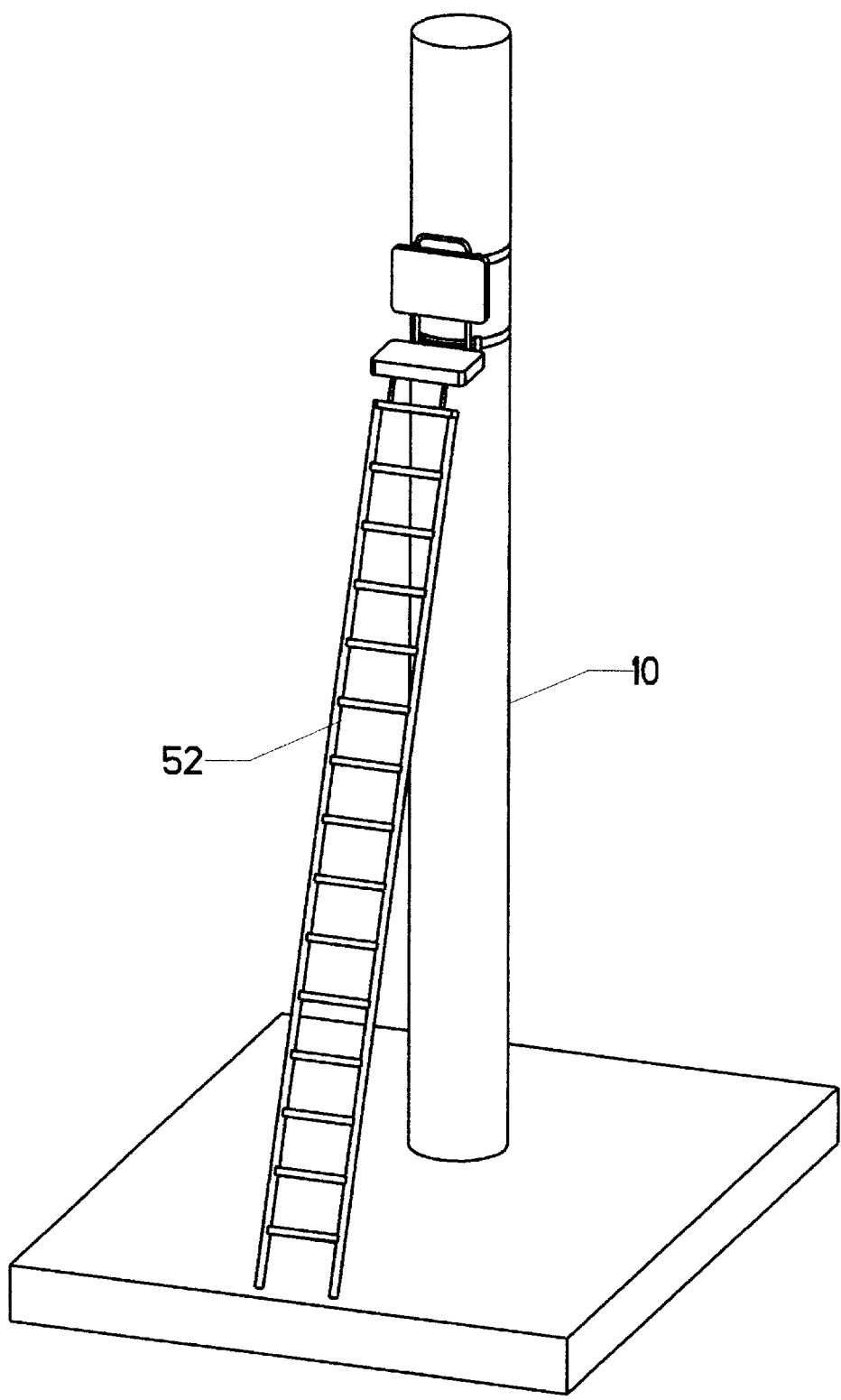
FIG. 15 is an isometric view, showing a prior art ladder stand.

The embodiment disclosed in FIGS. 3 through 14B is well suited for use with roughly cylindrical objects. It should be noted, however, that the invention can also be applied to other devices. FIG. 15 illustrates one such device. Ladder stand 52 is a common prior art device. Being rigid, it is affixed to tree 10 by one or two securing devices up near its top. The bottom portion is simply placed on the ground. While quite effective, it faces the same security problems as many other prior art devices. Once left unattended, anyone can climb up and remove the device. Likewise, persons may be injured while climbing the device.

Figure 16:
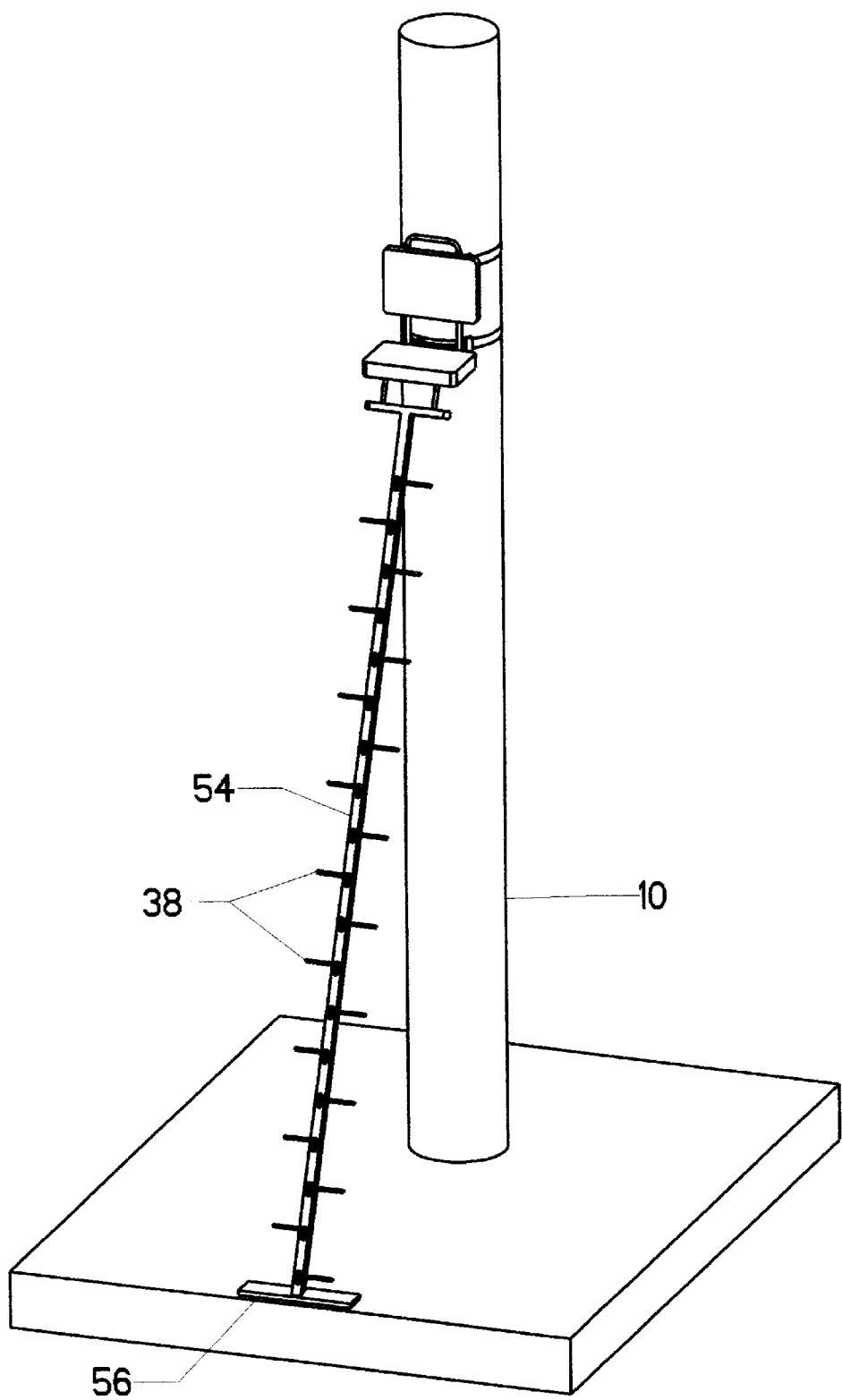
FIG. 16 is an isometric view, showing the application of the present invention to a prior art ladder stand.

FIG. 16 illustrates the application of the present invention to ladder stand 52. Slotted column 54 is substituted for the prior art ladder. A set of removable rungs 38 are then placed in slotted column 54. Base 56 is provided to distribute the weight of the device and prevent slotted column 54 from sinking into the ground.

Figure 17:
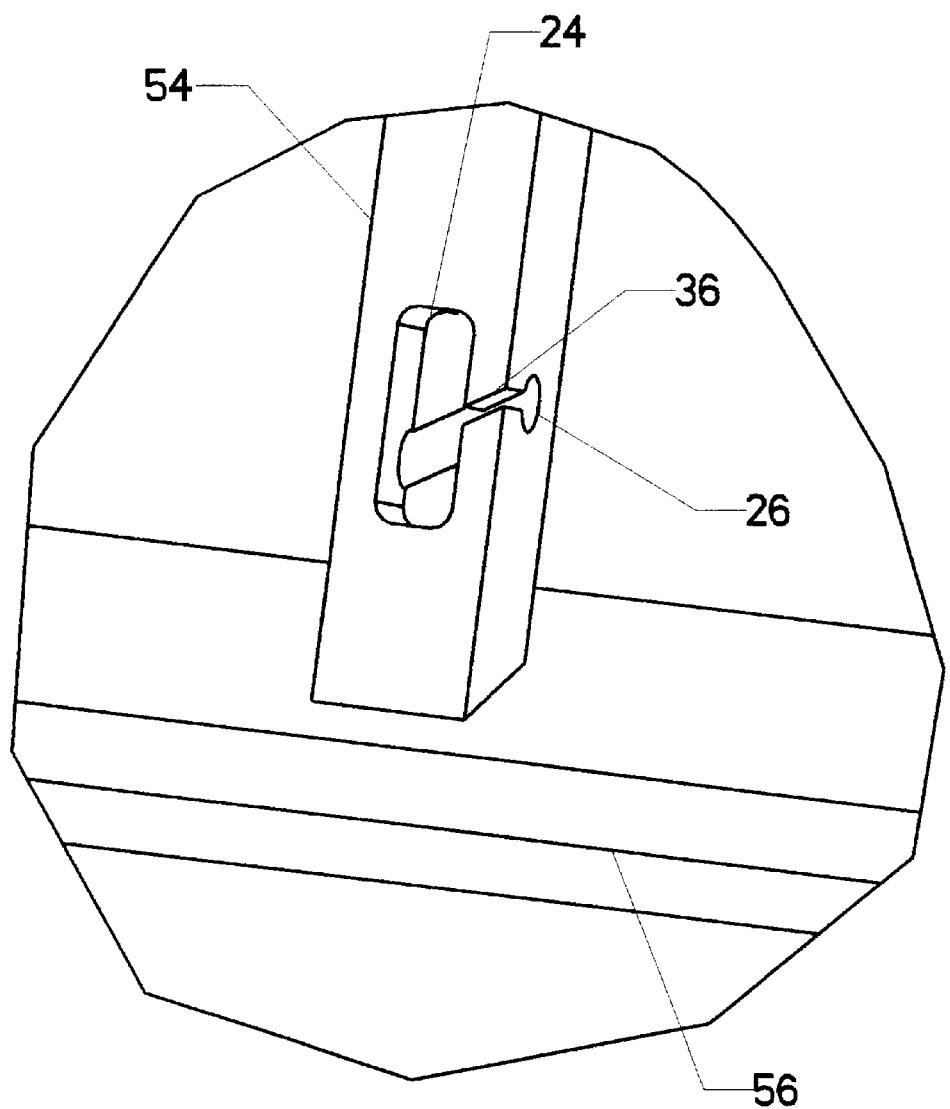
FIG. 17 is an isometric view, showing the detail of the vertical column used in a ladder stand.

FIG. 17 shows a detail view of the junction of slotted column 54 with base 56. The reader will observe that slotted column 54 incorporates a series of slots 24, inclined holes 26, and insertion slots 36. These are configured to allow the installation of removable rungs 38 on alternating sides, as shown in FIG. 16. Thus, the application of the present invention to the ladder stand 52 allows the user to leave the ladder stand in place without any rungs 38 being present.

Observation stands using a tripodal support are also common in the field of hunting. The present invention could be applied to this type of stand by substituting slotted column 54 for one of the three support legs. As another example, a power company could use slotted column 54 to provide access to the top of a pole. Rather than leaning slotted column 54 against the pole, it would be bolted on directly. This would also allow the application of the device to non-cylindrical objects. With appropriate standoffs 20 to allow clearance for the user's foot, slotted column 54 could be bolted to a flat wall. Those skilled in the art will realize that a virtually infinite number of applications are possible.

Figure 18:
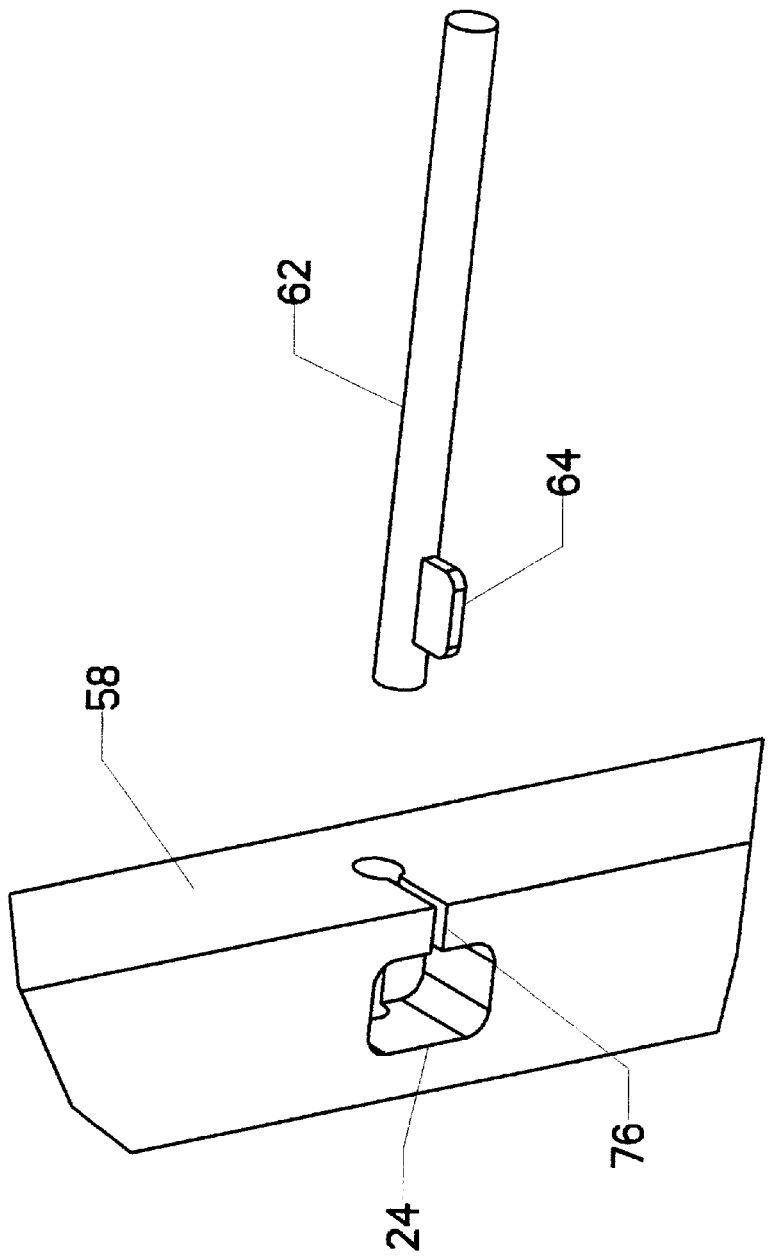
FIG. 18 is an isometric view, showing an alternate embodiment of the removable rung.

Those skilled in the art will also realize that many types of locking mechanisms can be used to implement removable rung 38. One alternative design is shown in FIG. 18. First alternate step 62 is simply a straight rod having first alternate key 64. Alternate stick 58 has slot 24, transverse hole 60, and alternate insertion slot 76. First alternate step 62 is installed by placing it into transverse hole 60 (sliding first alternate key 64 through alternate insertion slot 76), and turning first alternate key 64 down within slot 24.

Figure 19:
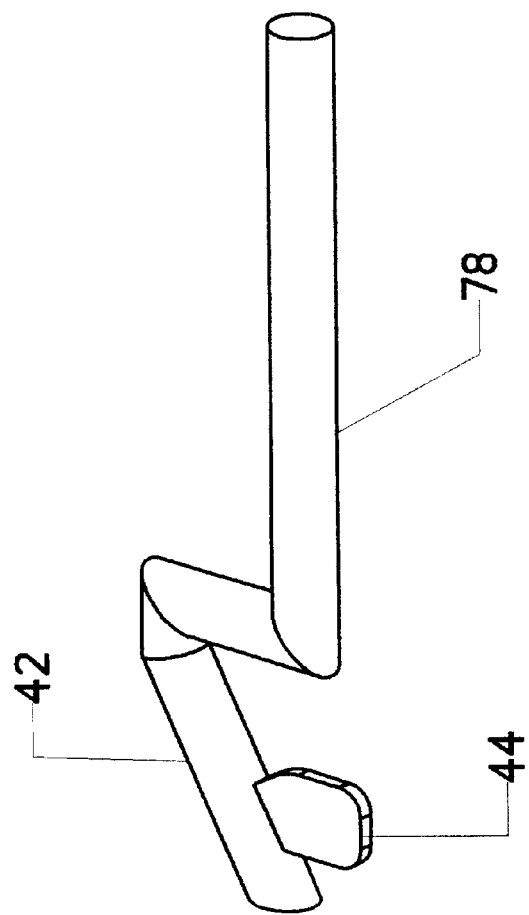
FIG. 19 is an isometric view, showing an alternate embodiment of the removable rung.
Figure 19B:
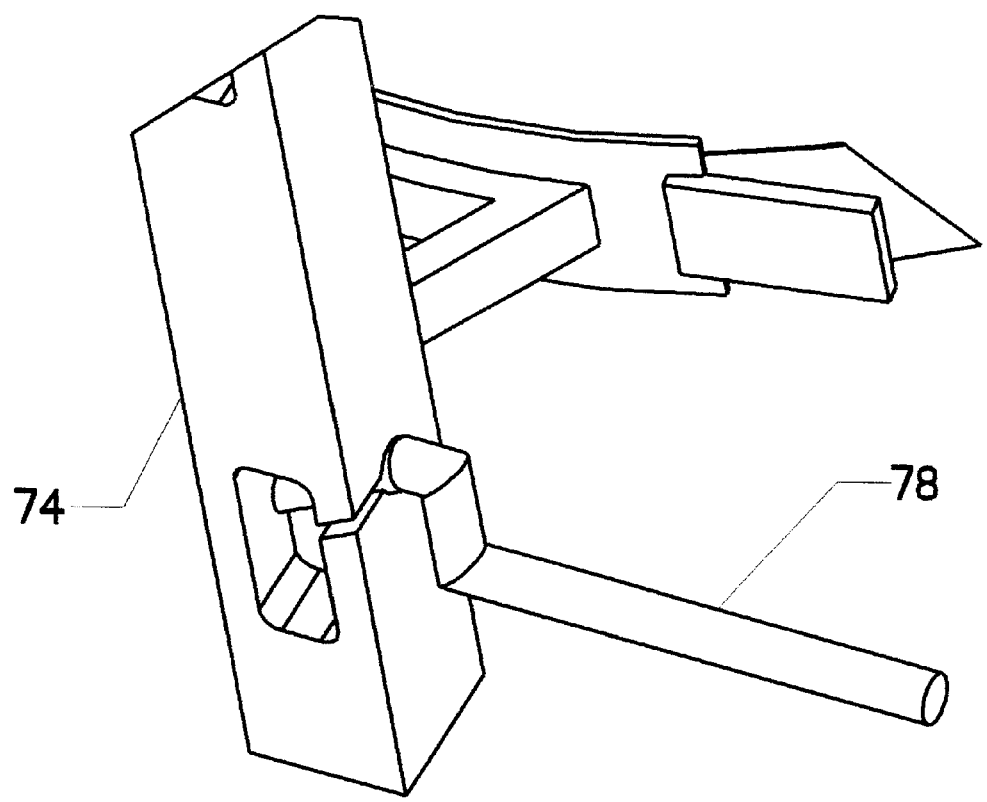
FIG. 19B is an isometric view, showing the alternate rung installed.

FIG. 19 shows a second alternate embodiment. Insertion cylinder 42 and key 44 are the same as those shown in FIG. 6. However, step 40 has been replaced by Z step 78. FIG. 19B shows this second alternate embodiment installed in vertical support column 74.

Figure 20:
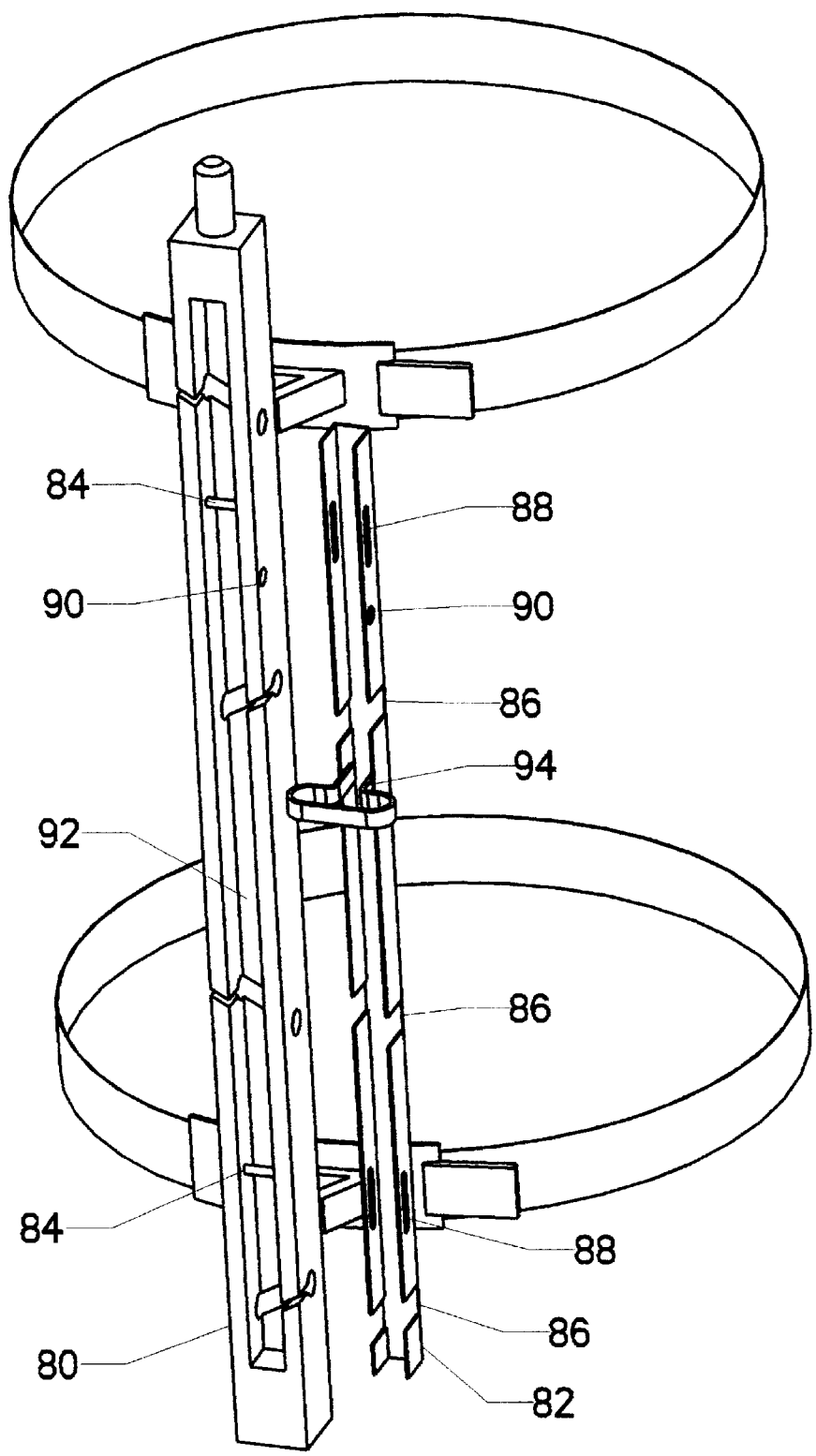
FIG. 20 is an isometric view, showing an additional locking device.

The previous embodiments provide security, but it is always possible that unauthorized persons may have the removable rungs and therefore be able to climb the unattended ladder. An additional security measure is therefore needed. FIG. 20 shows second alternate stick 80. It is identical to slotted stick 22 except that it has a single open channel 92 in its front face instead of a series of slots 24. Lock slide 82 rests within open channel 92. It is free to slide up and down, but is retained by the fact that two retaining pins 84 are inserted through pin channels 88 in lock slide 82.

The sides of lock slide 82 open into a series of access cuts 86. These access cuts 86 allow the user to insert removable rungs 38 when lock slide 82 is in its unlocked position.

Figure 21:
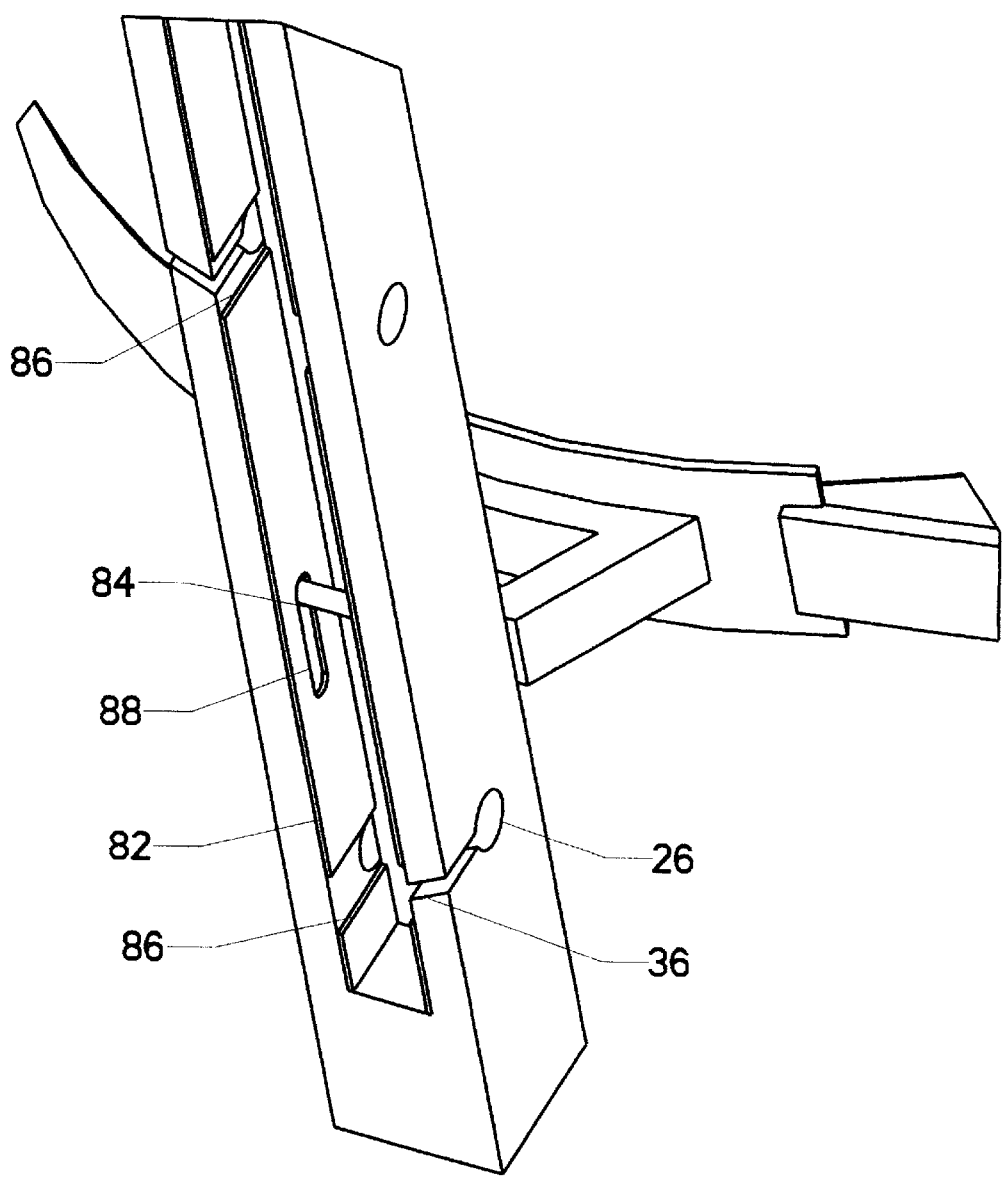
FIG. 21 is a detail view, showing the operation of the locking device.
Figure 22:
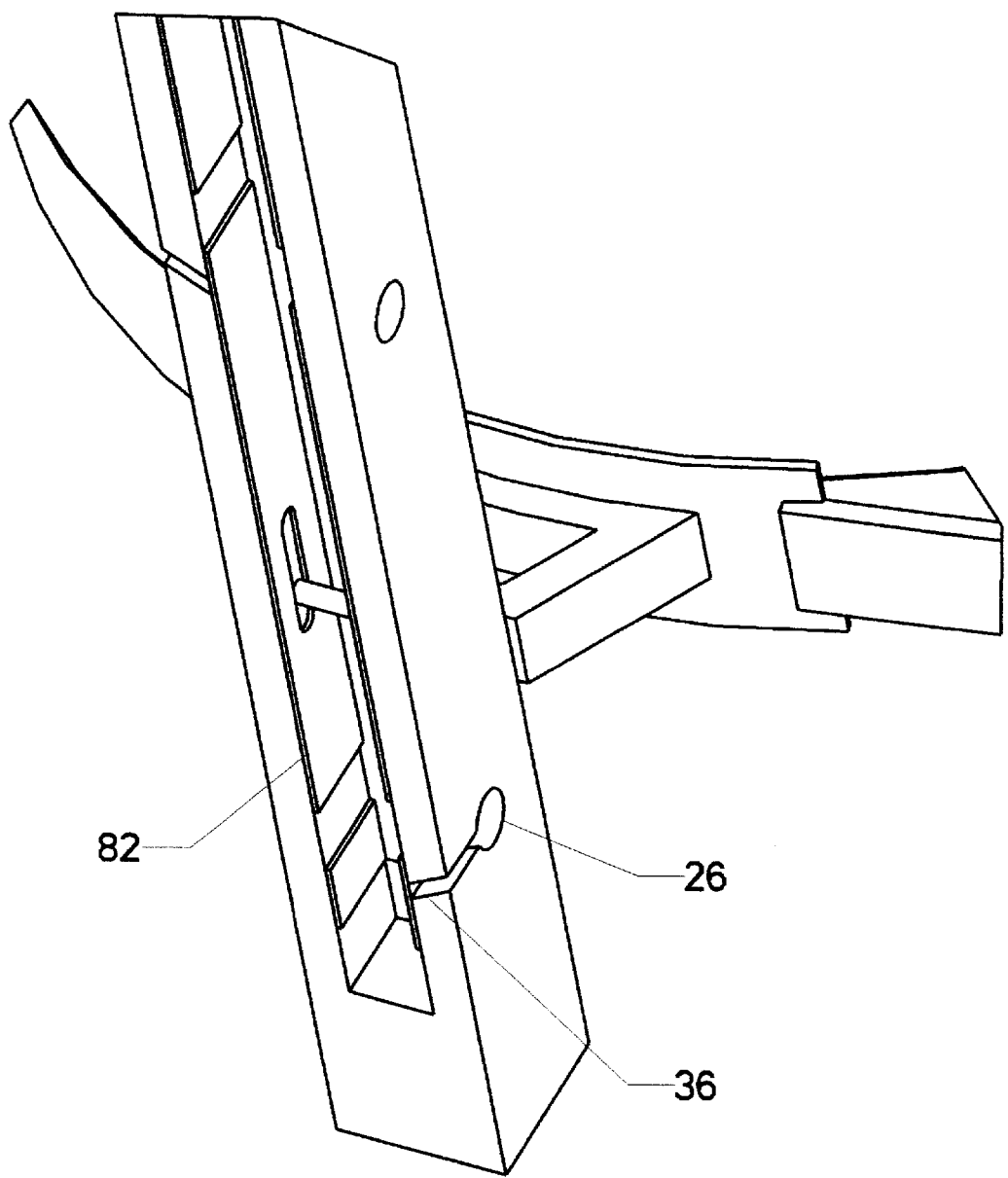
FIG. 22 is a detail view, showing the operation of the locking device.

FIG. 21 is a detail view showing lock slide 82 in its unlocked position. The reader will observe how lock slide 82 is free to move up and down by the interaction of pin channel 88 and retaining pin 84. The reader will also observe how the alignment of access cuts 86 allows the insertion of removable rungs 38. In FIG. 22, lock slide 82 has been pushed upward to its lock position. The solid side walls of lock slide 82 prevent the insertion of any removable rungs 38 when in this position.

Returning now to FIG. 20, the reader will observe that both second alternate stick 80 and lock slide 82 are pierced by a lock hole 90. These two holes align when lock slide 82 is translated upward to its locked position. At that point, the user can insert a padlock or other locking device through the aligned lock holes 90. When this is done, lock slide 82 will be secured in its locked position.

The reader will also observe that handle 94 is provided as part of lock slide 82. When second alternate stick 80 is attached to a tree or other vertical object, handle 94 lies in a convenient position for the user to grab and manipulate lock slide 82. While it is possible for the user to manipulate lock slide 82 without handle 94, handle 94 does provide additional convenience.

Because the embodiment shown in FIGS. 20–22 provides additional security, it is the preferred embodiment. Having read the preceding descriptions, the reader will understand that this preferred embodiment:

1. Provides rungs which are easy to apply and remove;
2. Provides rungs which are light;
3. Provides rungs which are compact; and
4. Does not need a large interior cavity in its vertical support column.

Although the preceding description contains significant detail, it should not be construed as limiting the scope of the invention but rather as providing illustrations of the preferred embodiment of the invention. Thus, the scope of the invention should be fixed by the following claims, rather than by the examples given.

Having described my invention, I claim:

1. A ladder having removable rungs, comprising:
   a. a vertical support column having a front face, a right side face, a left side face, and a hole passing completely therethrough from said right side face to said left side face;
   b. wherein said front face includes a first slot which intersects said hole;
   c. a removable rung, including an insertion cylinder sized to slidably fit within said hole, a step, and a key extending outward from said insertion cylinder; and
   d. wherein said front face and said right side face of said vertical support column open into an insertion slot intersecting said first slot, sized to allow said key to slide therethrough, so that said removable rung can be inserted into said column by placing said insertion cylinder within said hole, and sliding said key within and through said insertion slot, so that said key eventually rests entirely within said first slot in said front face, so that when said removable rung is then rotated, said key rotates down into said first slot in said front face, thereby locking said removable rung in place.

2. A ladder as recited in claim 1, further comprising locking means slidably moveable with respect to said vertical support column between an unlocked position where said removable rung can be inserted in said column, and a locked position where said removable rung cannot be inserted in said column because said locking means obstructs said hole.

3. A ladder as recited in claim 1, wherein said hole has an intersection with said right side face and an intersection with said left side face, and wherein said intersection with said right side face is higher than said intersection with said left side face so that said hole is inclined from the horizontal.

4. A ladder as recited in claim 3, wherein said slot is bounded by a left side wall, a top wall, a right side wall, and a bottom wall, and wherein said key incorporates a camming surface, positioned to bear against said left side wall of said slot when said key rotates down into said slot.

5. A ladder as recited in claim 1, wherein said vertical support column is comprised of a plurality of sticks joined together.

6. A ladder having removable rungs, comprising:
   a. a vertical support column having a front face, a right side face, a left side face, and a hole passing completely therethrough from said right side face to said left side face;
   b. wherein said front face includes a first slot which intersects said hole;
   c. a removable rung, including an insertion cylinder sized to slidably fit within said hole, a step, and a key extending outward from said insertion cylinder; and
   d. wherein said front face and said left side face of said vertical support column open into an insertion slot intersecting said first slot, sized to allow said key to slide therethrough, so that said removable rung can be inserted into said column by placing said insertion cylinder within said hole, and sliding said key within and through said insertion slot, so that said key eventually rests entirely within said first slot in said front face, so that when said removable rung is then rotated, said key rotates down into said first slot in said front face, thereby locking said removable rung in place.

7. A ladder as recited in claim 6, further comprising locking means slidably moveable with respect to said vertical support column between an unlocked position where said removable rung can be inserted in said column, and a locked position where said removable rung cannot be inserted in said column because said locking means obstructs said hole.

8. A ladder as recited in claim 6, wherein said at least one hole has an intersection with said right side face and an intersection with said left side face, and wherein said intersection with said left side face is higher than said intersection with said right side face so that said hole is inclined from the horizontal.

9. A ladder as recited in claim 8, wherein said slot is bounded by a left side wall, a top wall, a right side wall, and a bottom wall, and wherein said key incorporates a camming surface, positioned to bear against said right side wall of said slot when said key rotates down into said slot.

10. A ladder as recited in claim 6, wherein said vertical support column is comprised of a plurality of sticks joined together.

* * * * *